(12) United States Patent
Horikoshi et al.

(10) Patent No.: US 7,024,700 B1
(45) Date of Patent: Apr. 4, 2006

(54) COMPUTER WITH SECURITY FUNCTION AND METHOD THEREFOR

(75) Inventors: Hideto Horikoshi, Sagamihara (JP); Mitsuhiro Yamazaki, Aoba-ku (JP); Jun Tanaka, Zama (JP)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 09/619,331

(22) Filed: Jul. 19, 2000

(30) Foreign Application Priority Data

Jul. 19, 1999 (JP) .................................. 11-205346

(51) Int. Cl.
G06F 11/30 (2006.01)
G06F 12/14 (2006.01)
H04L 9/00 (2006.01)
H04L 9/32 (2006.01)

(52) U.S. Cl. ......................................... 726/34; 726/36
(58) Field of Classification Search ................ 713/200, 713/300, 324; 726/34
See application file for complete search history.

(56) References Cited

U.S. PATENT DOCUMENTS

| 5,467,469 A | * | 11/1995 | Saito et al. ..................... 714/14 |
| 5,590,376 A | * | 12/1996 | Kou ............................. 710/19 |
| 5,936,527 A | * | 8/1999 | Isaacman et al. ........ 340/572.1 |
| 6,038,320 A | * | 3/2000 | Miller .......................... 380/44 |

* cited by examiner

*Primary Examiner*—Gilberto Barrón, Jr.
*Assistant Examiner*—G. Gurshman
(74) *Attorney, Agent, or Firm*—Louis P. Herzberg; Anne Vachon Dougherty (57) ABSTRACT

When the computer is powered on, a POST program is executed, and in the setting for enabling a security function, an RFID chip 33 makes Removal Detect Enable a high level and outputs it to the control side of an analog switch 67 and one input of a NAND element 63. The removal of an RF antenna 37 causes a first short-circuit element 36 to be disconnected for shutting off a terminal 71 and a terminal 73, and an INTR signal for prohibiting the keyboard input is outputted by the high-level signal of the element 63 to prohibit access to the computer. If the RF antenna is removed while the power is off, the analog switch 67 is disconnected and the power supplied from a lithium battery to a CMOS memory 50 is shut off, whereby access to the computer can be prohibited.

22 Claims, 7 Drawing Sheets

COMPUTER WITH SECURITY FUNCTION AND METHOD THEREFOR

FIELD OF THE INVENTION

The present invention relates to a technique for prohibiting access to a computer using a device which is in charge of part of the security function detachably attached to the main body of the computer to prevent a theft of or unauthorized access to the computer.

BACKGROUND OF THE INVENTION

A notebook computer is excellent in portability, but is illegally carried away to the outside very easily. As the computer use has become sophisticated and versatile in recent years, a user increasingly tends to store important information in the computer, and if the computer is stolen, the loss of information resources by leakage becomes larger as compared with the loss of the physical resources of the computer.

Published Unexamined Patent Application Nos. 8-50690 and 10-124764 disclose an electronic article monitor system using a non-contact communication technique called an RF (Radio Frequency) transponder system. The RF transponder system commonly includes an exciter/reader or ER, and an RFID transponder or an RFID (Radio Frequency Identification) tag. An RFID tag is attached to an article in an area to be monitored, and an ER is placed at the gate of the area to continuously generate an RF exciting signal. When the article having the RFID tag approaches the gate, the ER sends the exciting signal to give power to this, so the RFID tag itself does not need particular power for operation. Upon receipt of the RF exciting signal, the RFID tag generates an identifier code and other data signals, and sends them back to the ER as a response signal at a specified frequency. When the ER detects the identifier code included in the response signal, it gives an alarm sound to prevent the theft of the article at need. To carry the article away from the monitoring area without sounding an alarm, it is needed to set the RFID tag to a state of not sending an alarm signal, or to remove it.

Published Unexamined Patent Application No. 5-35354 discloses a technique for preventing a notebook computer from being stolen. A notebook computer is provided with antitheft means for detecting changes in the setting statuses such as amount of setting tilt, setting pressure, and setting distance, and means for raising an alarm in response to changes in the setting statuses. The computer continuously monitors the setting statuses when these means are ready to exhibit their functions, and it gives an alarm if someone attempts to carry away the computer from a specified position without permission, thereby to prevent a theft.

Published Unexamined Patent Application No. 3-100894 discloses a technique for prohibiting unauthorized access by inhibiting key entry when a mobile terminal is stolen. If a mobile terminal is stolen, the host computer sends a predetermined signal by radio to the terminal, and in response to this, a program in the terminal operates to inhibit key entry.

As described above, a technique is known which uses an RFID tag to prevent an article from being stolen, and there are also known a technique for preventing a notebook computer from being illegally carried away from an area to be monitored, and a technique for protecting information resources by locking key entry when a computer is stolen. However, there has not been disclosed yet a technique in which an RFID tag is attached to a computer for preventing unauthorized access to the computer when it is stolen.

To prevent a theft of or unauthorized access to storage information, a device such as an RFID tag needs to be attached to a computer. On the other hand, not all users need such device, and, in general, private users need it less as compared with large-scaled corporate use. It is not preferable to sell all computers with a security function attached to it, because users who do not need it are forced to pay an extra expense. Accordingly, for computers of the same type included in a specific series, it is required that some of them have a security function and others have not.

However, for computers included in a specific series, it is preferred to share hardware and software as much as possible in the points of the sales cost and the maintenance of after-sales service. To divide the computers of a specific series into those having a security function and those having no security function when manufacturing and selling them apparently seems to make equitable the cost bearing of the users who do not need the security function, but the cost bearing increases for portions which cannot be shared, resulting in disadvantage also for such users. Thus, it is required to simultaneously solve the problems of the hardware and software sharing and the equality in the cost bearing by the user's selection of the security function.

There is a solution for this in which, if a certain security function comprises a plurality of hardware and software structural elements, some of the structural elements are made common, and the remaining part is made to be an optional component which can be added by a dealer or user at need, thereby to complete the security function. However, if the device in charge of part of the security function is attached by the user or dealer (such device is hereinafter simply referred to as security device), it is expected that such part could be illegally removed to break the security function.

Accordingly, it is an object of the present invention to provide a technique which prohibits access to a computer if a partial device in charge of the security function of the computer is removed from the computer. Further, it is another object of the present invention to provide a preferred attachment construction for a security device which is optionally attached by a user or dealer.

SUMMARY OF THE INVENTION

The computer related to the present invention has a construction enabling a security device to be optionally attached to the computer, and a computer with a security function is constructed by attaching the security device, whereas the removal of the security device constructs a computer without a security function. Although the procedure for prohibiting access to a computer in the present invention can be started in association with a particular event such as the power-on and the energy-saving mode, particularly the minimum energy mode of the computer, the CPU may be made to always monitor it by polling. The load on the CPU can be reduced by starting the procedure in association with a specific event.

The first embodiment of the present invention is a method for prohibiting access to a computer after a security device attached to the computer is removed, comprising the steps of: (a) storing and maintaining setting data for setting the attachment of the security device to the computer in first storage means equipped in the computer; (b) detecting the attachment of the security device to the computer after the step (a) and during the power-on or the energy-saving mode of the computer; (c) storing and maintaining the attachment data indicating the detection in the step (b) in second storage means equipped in the computer; (d) detecting a removal of the security device from the computer based on the setting data and the attachment data; and (e) prohibiting access to the computer in response to the detection in the step (d).

The security device in the present invention means a device which is hardware in charge of part of the security function of a computer is prepared as an optical part, and has easiness in attachment to an extent that it can be removed by a user or dealer. For instance, in the security system utilizing RFID, it may be an RF antenna, and in the security system utilizing fingerprint detection, it may be a fingerprint input portion. Further, the security system includes a connection member such as a jumper or the like. The first storage means is a storage medium which can maintain the storage contents while the main power supply of the computer is at a halt, and EEPROM, a hard disk or the like can be selected. Furthermore, it may be an RAM to which power enabling storage to be maintained is continuously supplied by a secondary battery even if the main power supply is at a halt. As the second storage means, an RAM, a circuit element or the like can be selected, to which power enabling storage maintenance is continuously supplied if the main power supply halts and a backup power supply (battery or power supply by energy-saving mode) is operating. In addition, the computer is provided with an internal basic power supply such as a battery, and with this internal basic power supply, power is supplied to a CMOS memory for backing up the basic construction information such as the construction information of the computer. This procedure can be commonly executed for any of the computer having the security function and the computer having no security function, and only for the computer having the security function, access is prohibited when the security device is removed.

In the above described first embodiment, setting data for setting the attachment of the security device to the computer is stored by step (a). This setting data may be set before the attachment of the security device, or may be set after the attachment. The system recognizes that the computer is a computer having a security function, and if the security device is removed from the computer, access to the computer is prohibited as long as a password is entered by the following procedure, deeming that there is an illegal action. By step (b), it is recognized that the computer is a computer having a security function. The verification of this is enabled by providing a conduction part in the security device, and detecting the existence of the conduction part. And, the attachment or detachment of the security device to or from the computer is maintained by step (c). The maintenance is enabled not only by a memory but also by setting of a flag or counting by a counter. Then, the removal of the security device is checked, and if the security device is removed from the attachment state, access to the computer is prohibited in step (e) because it is an illegal action. To legally remove the security device, a password can be entered to secure access.

The second embodiment of the present invention is a method for prohibiting access to a computer after the security device attached to the computer is removed, comprising the steps of: (a) storing and maintaining setting data for setting the attachment of the security device to the computer in first storage means equipped in the computer; (b) connecting the connection means of an internal basic power wiring equipped in the computer after the step (a) based on the setting data, thereby to secure a power line; (c) disconnecting the connection means while the security device is attached to the computer to form the power line of the internal basic power supply; (d) maintaining the disconnection in the step (c); and (e) prohibiting access to the computer by the disconnection.

In the above descried second embodiment, the connection of a lithium battery or the like, or the conduction of the power line of the internal basic power supply is carried out in step (b). This conduction is enabled by connection means such as an analog switch. With this, even for a computer having no security function, the internal basic supply is not shut down. In step (c), the disconnection is performed when the power line of the internal basic power supply is formed by the security device, and after the security device is once attached and the system recognizes that this computer is a computer having a security function. This is because the internal basic power supply is not disconnected even if the connection is released, since the power line of the internal basic power supply is formed by the security device. In step (d), the disconnection is maintained. This disconnection is preferably performed by the power supplied from the internal basic power supply because of the difficulty of initialization. If the security device is removed, and if it is unauthorized access to the computer, the power line of the internal basic power supply is disconnected, and the one within the computer which is supplied with power from the internal basic power supply is initialized, so access to the computer is prohibited by step (e).

Each step described in the first and second embodiments of the present invention can be carried out on the computer by means of a computer program. Such program can be stored in a nonvolatile memory called EEPROM or FLASH ROM, a hard disk, a floppy disk, or the like which can be used as third storage means, and it can be read out into the main memory and executed in the processing unit when the computer is operating.

In the third embodiment of the present invention, since the first storage means can maintain storage while the main power supply of the computer is at a halt, the setting for the attachment of the security device is not erased. Further, the second storage means can maintain storage while the main power supply at a halt and the backup power supply is operating. As this backup power supply, a battery or a power supply by an energy-saving mode can be selected, and a wider variety of elements or circuits can be utilized.

In the fourth embodiment of the present invention, the internal basic power wiring is connected by connection means which is operated by the internal basic power supply. This allows the power line from the internal basic power wiring to be secured. The connection means is disconnected when the security device is attached to the computer to form the power line of the internal basic power supply. This is because the power line by the security device is formed, and the connection of the connection means becomes duplicate. This disconnection is maintained, and if the security device is removed in this state, the power supplied from the internal basic power supply is cut off, so the information maintained by the power supplied from the internal basic power supply, for instance, the setting information or password, is erased to prohibit access to the computer.

The security device of the present invention can be integrated into a lid portion of the device bay to make an optional part without consuming any additional space of the computer. As the lid of the device bay, one of the optional parts can be selected, that is, the lid into which the security device is integrated, and the single lid into which no the security device is integrated. It can be attached to the computer by a user or dealer. The security part includes connection members such as an RF antenna and a jumper.

BRIEF DESCRIPTION OF THE DRAWINGS

The invention will now be described in greater detail with specific reference to the appended drawings wherein.

DETAILED DESCRIPTION OF THE INVENTION

Outline of the Computer System

Figure 1:
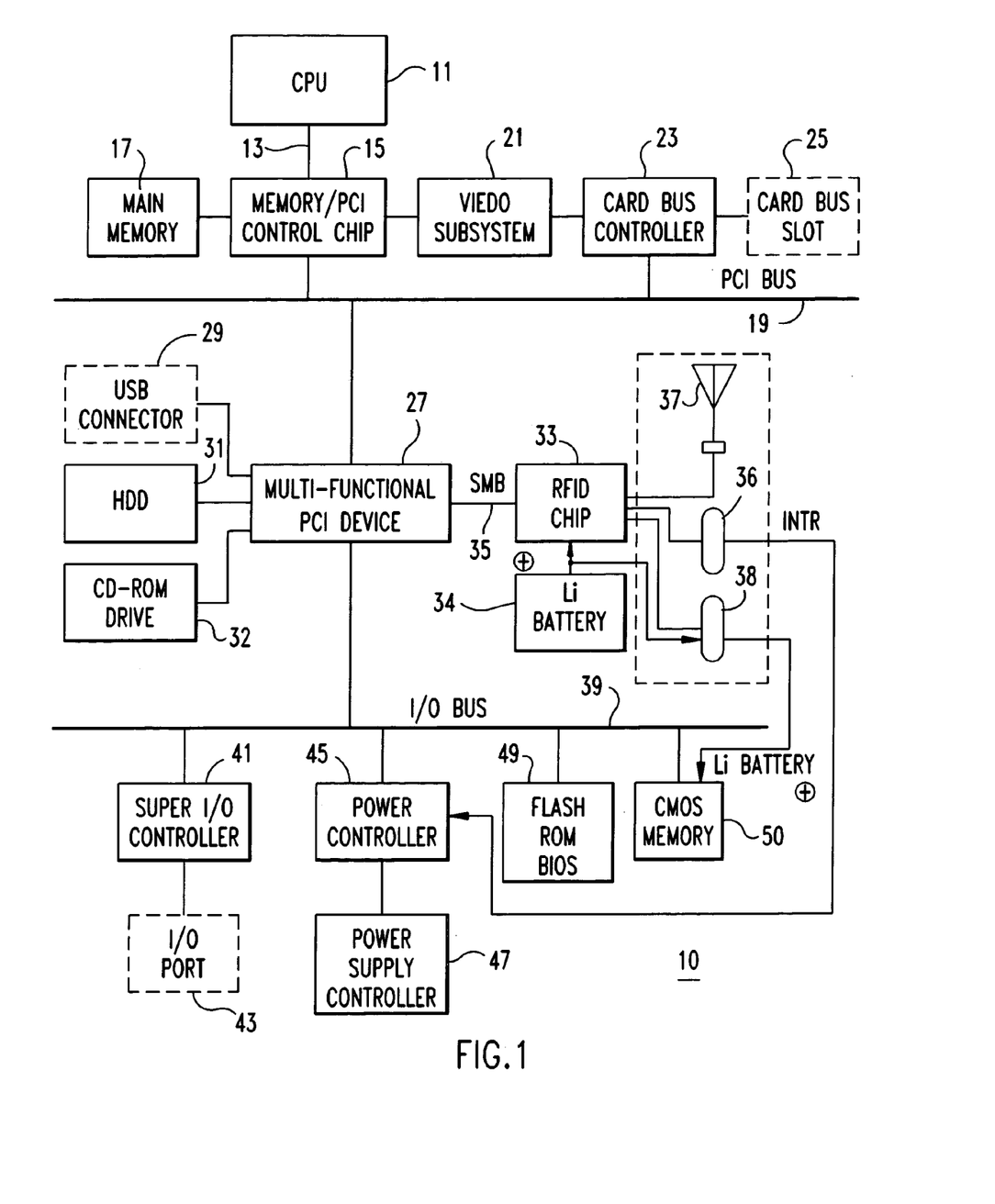
FIG. 1 is an example of the schematic block diagram of the computer in which the present invention is carried out.

FIG. 1 diagrammatically shows the hardware configuration for each subsystem of a typical notebook personal computer 10 suitable for carrying out the present invention. A CPU 11 is adapted to execute various programs under the control of an OS. The CPU 11 is connected through a system bus 13 to a bridge circuit (host-PCI bridge) commonly called a memory/PCI control chip 15. The memory/PCI control chip 15 of this embodiment has a construction which includes a memory controller function for controlling the access operation to a main memory 17, and a data buffer for absorbing the difference of the data transfer speed between the system bus 13 and a PCI bus 19.

The main memory 17 is a writable memory, which is used as an area into which the execution programs of the CPU 11 are read, or a work area into which the processing data of the execution programs are written. The execution programs include an OS such as Windows 98, various device drivers for hardware operation of peripheral devices, application programs directed to specific applications, and a BIOS stored in a FLASH ROM 49. A video subsystem 21 is a subsystem for implementing a function related to video, and it includes a video controller which actually processes drawing instructions from the CPU 11, temporarily writes processed drawing information to a video memory (VRAM), and reads out the drawing information from the VRAM and outputs it to a liquid crystal display (not shown) as drawing data.

A card bus controller 23 is a special controller for directly connecting the bus signal of the PCI bus 19 to the interface connector (card bus) of a PCI card slot 25. The PCI bus 19 and an I/O bus 39 are interconnected by a multi-functional PCI device 27. The multi-functional PCI device 27 of this embodiment comprises a function as a bridge between the PCI bus 19 and the I/O bus 39, a DMA controller function, a programmable interruption controller (PIC) function, a programmable interval timer (PIT) function, an IDE (Integrated Drive Electronics) interface function, a USB (Universal Serial Bus) interface function, and an SMB (System Management Bus) interface function, and for instance, a device called PIIX4 provided by Intel Corporation can be selected. To the IDE interface, an IDE hard disk drive (HDD) 31 is connected, and an IDE CD-ROM drive 32 is also connected. Further, instead of the IDE CD-ROM drive 32, an IDE device of another type such as DVD (Digital Video Disk or Digital Versatile Disk) drive may be connected. An external storage device such as the HDD 31 or CD-ROM drive 32 is accommodated, for instance, in a storage location called a "media bay" or "device bay" in the system 10. These standard external storage devices may be equipped exchangeably and exclusively with other equipment such as a FDD or battery pack.

To the multi-functional PCI device 27, an RFID chip 33 a exhibiting the function as an RFID tag is connected. To the RFID chip 33, an RF antenna 37, a first short-circuit element 36, and a second short-circuit element 38 are connected. The RF antenna 37, first short-circuit element 36, and second short-circuit element 38 are integrated into the lid portion of the device bay for accommodating the HDD 31 into the computer 10. A user who do not need the security function can choose the device bay lid into which the RF antenna 37 is not integrated. That is, the RF antenna 37, first short-circuit element 36, and second short-circuit element 38, which are part of the security device, are optional parts, and the user himself or the dealer can attach either the lid with antenna to which the RF antenna 37, first short-circuit element 36, and second short-circuit element 38 are added, or the lid without antenna. The RFID chip 33 has a security function for receiving the RF exciting signal sent by a reader/writer with the RF antenna 37, and prohibiting the computer from being illegally carried away or accessed.

Further, in this embodiment, the RFID chip 33 is connected to a lithium battery 34 to strengthen the security function. The lithium battery 34 is usually a battery power supply difficult to be exchanged, because it is to supply power to the system memory area for making a memory (so-called CMOS memory) 50 maintaining the current system construction information nonvolatile, and supply power for backing up the self-contained clock, as well known. These elements are in charge of part of the security function of the computer 10, and the operations of them are outlined later.

As the I/O bus 39, for instance, there is an ISA bus, to which a Super I/O controller 41, a power controller 45, a FLASH ROM 49, and the memory (so-called CMOS memory) 50 are connected. The Super I/O controller 41 is a peripheral controller for controlling the driving of a floppy disk drive (FDD), the inputting/outputting of parallel data (PIO) through a parallel port, and the inputting/outputting of serial data (SIO) through a serial port, and to which an I/O port 43 is connected. The power controller 45 is a single chip microprocessor for mainly performing the power management or thermal management in the system, and a H8/300 chip provided from Hitachi Ltd. can be selected. The power controller 45 comprises an MPU, RAM, ROM, and timer, and in the ROM, a program necessary for performing the power management and thermal management, and a reference table are stored. A power supply controller 47 is connected to the power controller 45. The power supply controller 47 includes a charger for charging the battery, and a DC/DC converter for generating a constant voltage such as 5 V or 3.3 V used in the computer 10, directly performs power control under the power controller 45.

The FLASH ROM 49 is a programmable nonvolatile memory for permanently storing firmware such as a code group (BIOS: Basic Input/Output system) for controlling the input/output operation of each hardware such as a keyboard or a floppy disk drive (FDD), and a self-test program at the power-on time (POST: Power On Self Test). The memory (so-called CMOS memory) 50 is a memory supplied with power from the lithium battery 34 to maintain the current system configuration information in the system memory area. To construct the computer system 10, many electric circuits other than those shown in FIG. 1 are necessary. However, these are well known to a person skilled in the art and they do not constitute the gist of the present invention, and thus they are omitted in this specification.

Security Function Using RFID

It can be said that the RFID is generally a function to write or read ID (identifier) to or from an EEPROM by using RF (Radio Frequency) or by radio. The RFID is not only characterized by information exchange using radio, but also the maximum characteristic resides in the point that, if a reader/writer is placed on one side and an RFID tag is placed on the other side, the RFID tag do not need a power supply for information exchange between the two. The reader/writer sends an RF exciting signal to the RFID tag to excite the RFID tag for generating power, and the RFID tag sends back data to the reader/writer using that power. The use of data read/write function by the RFID allows much information to be exchanged between a computer whose power supply is at a halt and the reader/writer, and this can be used for the inventory control of computers or the like.

Figure 2:
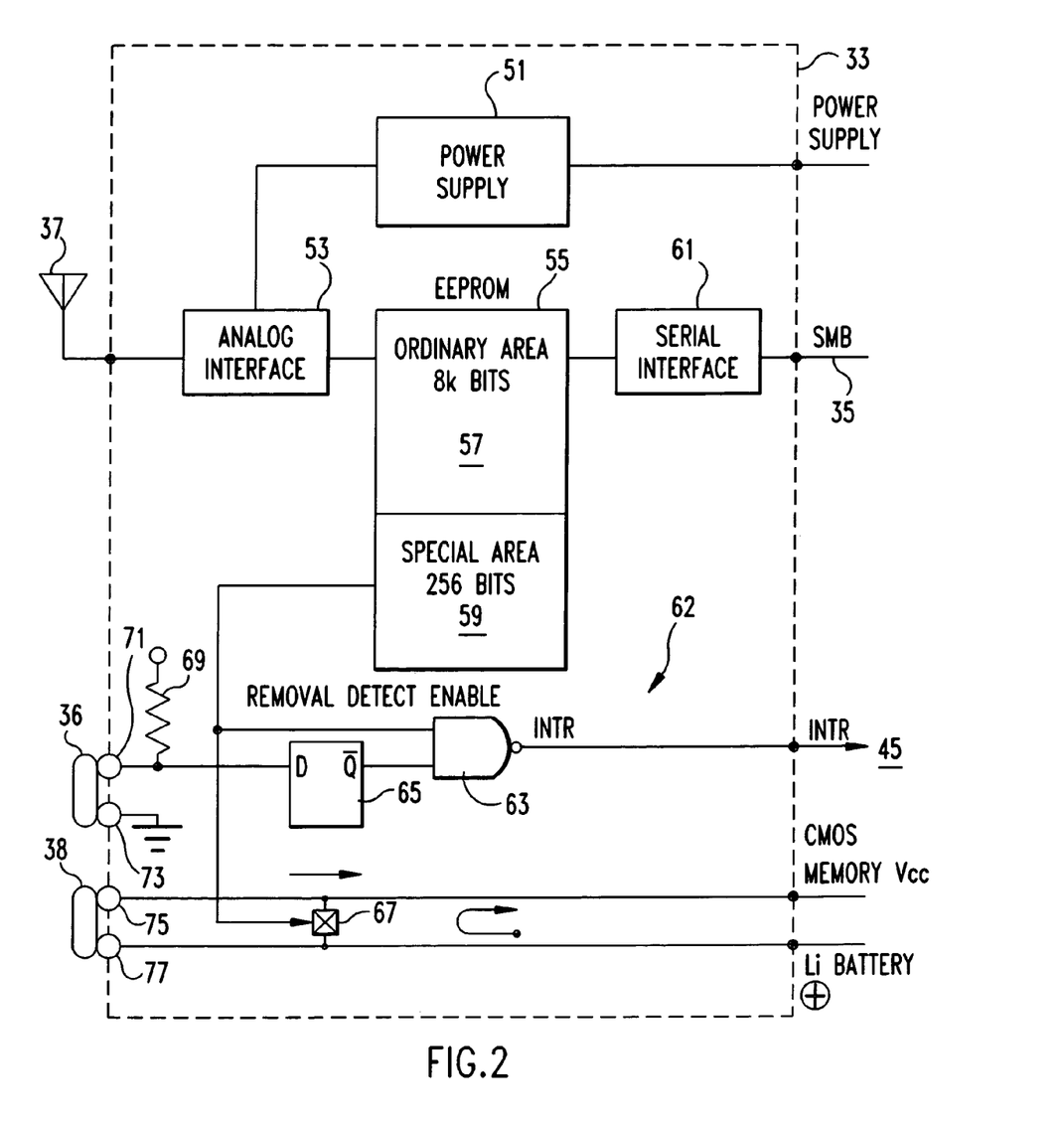
FIG. 2 is a schematic block diagram of the RFID chip used in the embodiment of the present invention.

As other usage pattern of the RFID, there is the one related to the security function of a computer. FIG. 2 schematically depicts the internal construction of the RFID chip 33 as an RFID tag. As such RFID chip, there is an EEPROM (Asset identification EEPROM) having a model of AT24RF08 provided from ATMEL Corporation. The memory area of the EEPROM 55 included in the RFID chip 33 is divided into an ordinary area 57 of 8K bits and a special area 59 of 256 bits. To the ordinary area 57, the data of the RF exciting signal received at the RF antenna 37 is written through an analog interface 53, and the written data is sent through the interface 53 and the RF antenna 37. Further, the EEPROM 55 and the computer 10 communicate with each other through a serial interface 61 and the SMB 35, whereby the writing and reading can be performed from the computer with respect to the ordinary area 57 and the special area 59.

One memory area is provided in the special area 59. It is an Removal Detect Enable bit showing the setting for detection of attachment of the RF antenna. The Removal Detect Enable bit is set when the RF antenna is attached as an optional part by a prepared setup utility, and "1" is set when a user having a proper password sets it. In the initial condition, namely, when the RF antenna is not attached, it is reset to "0" In the ordinary area 57, there are provided two memory areas. One of them is an Antenna History bit showing the history of attachment status of the RF antenna, which is set to "1" when the attachment of the RF antenna to the computer 10 is detected. The other one is an Antenna Error bit, which is set to "1" when the removal of the once attached RF antenna 37 is detected. The Removal Detect Enable bit, Antenna History bit, and Antenna Error bit cannot be reset unless a user having a proper password accesses the EEPROM 55 from the computer system via the SMB 35 and the serial interface 61.

In the special area 59, there are included a DE/DC bit area for detecting the attachment/removal of the RF antenna 37 with respect to the computer 10, a Tamper bit area which is set when the RF antenna 37 receives an RF exciting signal from the reader/writer placed near the gate or the monitoring area, an Access Protection bit area for locking the read/write to the ordinary area 57, and a Sticky bit which locks change of the Access Protection bit until the power supply of the computer turns off. The Access Protection bit is made up of two bits, if it is "00" or "01," any access to the ordinary area is prohibited, and only reading is permitted for "10," and writing and reading are allowed for "11."

The DE/DC bit area consists of a DE bit (Detect Enable bit) and a DC bit (Detect Coil bit). The RFID chip 33 checks the attachment/removal of the RF antenna 37 if the DE bit is set to "1" through the serial interface 61, and writes "1" to the DC bit if the RF antenna 37 is attached, and writes "1" if the RF antenna 37 is removed. If the power supply of the computer is on, the power supply 51 drives the analog interface 53, and if there is no power supply, the RF exciting signal received through the RF antenna 37 drives the analog interface 53, so the communication with the reader/writer is allowed even if there is no power supply.

Further, in this embodiment, the RFID chip 33 includes a digital interface 62. The digital interface 62 comprises a NAND element 63, a flip-flop circuit 65, and an analog switch 67, and it is constructed so that the status of the Removal Detect Enable bit ("1" or "0") written in the special area 59 is outputted as a high-level signal or a low-level signal to the control side of the analog switch 67 and one input side of the NAND element 63. The other input side of the NAND element 63 is connected to a terminal 71 through the flip-flop circuit 65. In this embodiment, the so-called D flip-flop is used as the flip-flop circuit 65, and the terminal 71 is connected to the input side (D-terminal), and the other input side of the NAND element 63 is connected to the negative logic output side (/Q-terminal). A power supply is connected between the input side (D-terminal) of the flip-flop circuit 65 and the terminal 71 through a resistor 69. A terminal 73 pairing with the terminal 71 is grounded, and the connection of the first short-circuit element 36 causes the terminals 71 and 73 to short-circuit. With this, the input side (D-terminal) of the flip-flop circuit 65 becomes a low level when the first short-circuit element 36 is connected, and a high level when disconnected. A connection is provided so that a system clock and a reset signal are inputted to the flip-flop circuit 65, though not shown. To output the connection status of the first short-circuit element 36 (connected or disconnected), the output side of the NAND element 63 is connected to the power controller 45. The output signal of the NAND element 63 functions as an INTR signal for inhibiting the input operation of the keyboard or the like described later. The power supply for supplying power to the NAND element 63, the above-mentioned flip-flop circuit 65, and the resistor 69 cooperates with the power control under the power controller 45, and it is assumed that power is supplied not only after the power-on but also in the power-saving mode for suppressing the power consumption such as so-called stand-by or suspend.

One terminal of the analog switch 67 is directly connected to the positive side of the lithium battery 34, and connected to a terminal 77. The terminal 75 pairing with the terminal 77 is connected to the power supply of the memory (so-called CMOS memory) 50 maintaining the above system configuration information, which is to be directly connected to the lithium battery 34, and connected to the other terminal of the analog switch 67. When the status of the Removal Detect Enable bit is "1," a high-level signal is supplied through the analog interface 53 to the analog switch 67, which becomes de-energized. This prevents the power of the lithium battery 34 from being supplied to the CMOS memory through the analog switch 67. On the other hand, when the status of the Removal Detect Enable bit is "0," a low-level signal is supplied to the analog switch 67, which conducts. This causes the CMOS memory and the lithium battery 34 to conduct through the analog switch 67. Accordingly, when the status of the Removal Detect Enable bit is "1," the connection of the second short-circuit element 38 causes the terminals 75 and 77 to be short-circuited to supply the CMOS memory with power from the lithium battery 34, and the disconnection of the second short-circuit element 38 shut off the power supply to the CMOS memory from the lithium battery 34. To the analog switch 67, power is directly supplied from the lithium battery 34, and the switch state can be maintained regardless of the power condition of the system. In addition, in this embodiment, description is made using hardware configuration, but the present invention is not limited to this, and software configuration may be used.

Outline of the Security Function to which the Embodiment of the Present Invention is Applied Now, schematic description is made to the security function of the computer to which the embodiment of the present invention is applied. If a computer in a power-off condition approaches the gate of an area to be monitored, the RF exciting signal generated by a reader/writer is sent to the RF antenna 37, and a Tamper bit is set in the special area 59 of the EEPROM 55. Then, at the power-on of the computer, the BIOS stored in the FLASH ROM 49 is written into the main memory 17, and the CPU 11 executes the POST and system initialization. When the POST detects the Tamper bit, the user is requested to enter a password and the execution of the POST is stopped at this point, the computer cannot be accessed unless the password is entered.

Since the RF antenna 37 can be attached by a user or dealer, as described above, a person wishing to illegally carry away the computer to the outside can pass through the gate after removing the RF antenna 37 to avoid the setting of the Tamper bit. In the embodiment of the present invention, the RF antenna 37 is optionally attached, but the other hardware is common to the case in which the RF antenna 37 is attached and the case in which it is removed. Further, both the case in which the RF antenna 37 is attached and the case in which the RF antenna is removed, the same software (BIOS) can be employed. An embodiment of the procedure a for prohibiting access to the computer when the RF antenna 37 is removed is described below.

Example Showing Basic Procedure

First, prior to describing the embodiment of the present invention, description is made to the basic procedure for prohibiting access to the computer when the RF antenna is illegally removed while the power is off and thereafter the power is made on.

Figure 3:
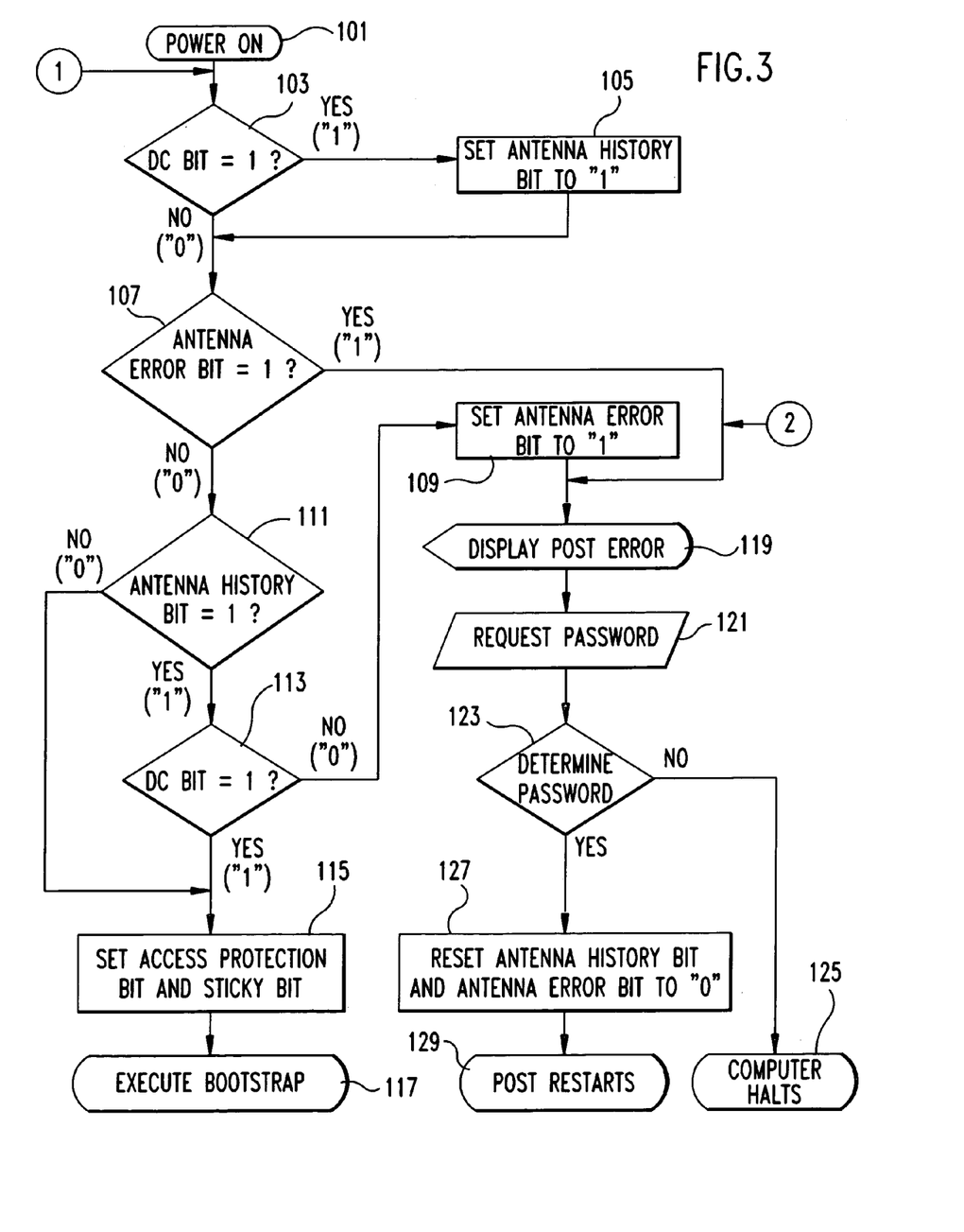
FIG. 3 is a flowchart of the first embodiment showing the procedure of the present invention.

FIG. 3 is a flowchart including the basic procedure for prohibiting access to the computer when the RF antenna is removed while the power is on, and then the power is made on. Whether or not the RF antenna is actually attached to the computer 10 to make the security function effective is unclear for the system at this point of time. The Antenna History bit and Antenna Error bit of the computer 10 are both set to "0" when shipped from the factory. If the power of the computer 10 is turned on in block 101, the BIOS is read out from the FLASH ROM 49 into the main memory 17, and the CPU 11 reads the POST program to execute the following procedure. In the RFID chip 33, the Access Protection bit and the Sticky bit are always set to "11" and "1," respectively, at power-on, allowing access to the ordinary area 57 by the BIOS. In block 103, the POST sets the DE bit of the special area 59 to "1" to determine whether or not the RF antenna 37 is actually attached to the computer. The RFID chip 33 checks the attachment condition of the RF antenna 37 accordingly, and it writes "1" to the DC bit if attached and "0" if removed.

The POST reads the DC bit after the elapse of about 200 microseconds since the DE bit is set to "1," and sets the DE bit to "0." If the DC bit is set to "1" and it is determined that the RF antenna 37 is currently attached, the process moves to block 105 to set the Antenna History bit in the ordinary area 57 to "1." At this point, it is determined by the system that the computer 10 is a computer having the security function, and thereafter the Antenna History bit continues to maintain this information even if the power is turned off as long as the user having the password rewrites it. If the DC bit is "1" and the removal of the RF antenna is verified, the process goes to block 107 to verify the Antenna Error bit in the ordinary area 57. To verify the Antenna Error bit at this point, though described in detail in block 109, corresponds to the verification as to whether or not the RF antenna once attached before the execution of the yesterday's POST has been removed.

If the Antenna Error bit is "1" in block 107, it means that the RF antenna 37 has been once attached before executing the previous POST and the RF antenna 37 has been removed at the stage of executing the yesterday's POST, the process moves to block 119, deeming that there was an illegal removal of the antenna. Thereafter, the Antenna Error bit continues to maintain this information even if the power is turned off as long as the user having the password rewrites it. If the Antenna Error bit is "0" in block 107, it is determined that there is no illegal removal of the RF antenna till the yesterday's execution of the POST, and the process moves to block 111.

In block 111, the Antenna History bit is verified. That is, it is verified whether or not the RF antenna 37 has been attached to the computer 10 till the current execution of the POST. Data to the Antenna History bit is written at the current execution of the POST by block 105, or in the POST yesterday or before. In block 111, the Antenna History bit of "0" means that the RF antenna has not been attached up to present, and the computer 10 is a computer having no security function, and the process goes to block 115. In block 111, if the Antenna History bit is "1," the RF antenna has been attached before the current execution of the POST, and the removal of the once attached RF antenna before the previous execution of the POST has not been detected (Antenna Error bit=0), and the process moves to block 113.

In block 113, the DC bit is checked again to determine whether the RF antenna 37 is attached or removed at the current execution of the POST. If the DC bit is "1" that is, the RF antenna 37 is actually attached to the computer 10, the process moves to block 115, deeming that the security device has not been removed. If the DC bit is "0," it means that the RF antenna was attached before the current execution of the POST (block 111), but it is found to be removed at the stage of current execution of the POST (block 113), and that the removal of the RF antenna once attached before the previous execution of the POST was not detected at or before the stage of previous execution of the POST (block 107), and the process moves to block 109 for processing. In other words, this is a procedure for processing, in the current POST, the case in which the RF antenna was removed between the previous execution of the POST and the current execution of the POST. This is because, if, at the time of previous execution of the POST, the RF antenna 37 once attached before that time was found to be removed, the Antenna Error bit is set to "1" at the previous execution of the POST, and the process moves from block 107 to block 119 for processing at the current execution of the POST.

The block 115 deals with the computer having no security function shown by the procedure coming from block 111, and the computer having the security function and from which the RF antenna 37 has not been removed after once attached, as shown by the procedure coming from block 113. In this case, since there is no removal of the security device, the Access Protection bit is set to "10," and further writing to the Antenna History bit and Antenna Error bit in the ordinary area is inhibited. Further, the Sticky bit is set to "0" to prevent change of the Access Protection bit until the computer is powered off. This is to prevent the Access Protection bit from being changed to "11" through the OS to rewrite the contents of the Antenna History bit or the Antenna Error bit. As a result, the rewriting of the Antenna History bit and the Antenna Error bit is allowed only between block 101 for power-on and block 115, and as a matter of fact, only the POST rewrites the bits during that. Subsequently, the process moves to block 117, where the BIOS executes a bootstrap to read the OS and application programs into the main memory for constructing the computer.

In block 109, the Antenna Error bit is rewritten to "1." Block 107 to block 113 are determined each time the POST is executed, and the Antenna Error bit is rewritten to "1" according to the result of it. Block 109 deals with the case in which the Antenna Error bit had not been rewritten to "1"

at the termination of the yesterday's POST (block 107), but the RF antenna 37 is found to be removed at the current execution of the POST (block 113), though it was attached in the past (block 111). Subsequently, the process moves from block 109 to block 119. Further, it also moves to block 119 if the Antenna Error bit determined in block 107 is "1." In block 119, a POST error is displayed on the display of the computer 10 in response to the case in which the Antenna Error bit is set to "1" by block 109 during the current execution of the POST, and the case in which the Antenna Error bit was "1" until the previous POST was completed.

Then, in block 121, a message requesting the user for a password is displayed on the display, and if the BIOS recognizes the inputting of the correct password in block 123, it rewrites the Antenna History bit and Antenna Error bit to "0." Subsequently, the POST restarts in block 129. In the POST that has restarted, no POST error display appears, and the procedure from block 101 to block 117 is cleared to execute the bootstrap.

If the BIOS does not recognize the correct password in block 123, the POST halts at this point and further access to computer is prohibited. After that, if the correct password can be inputted, the process restarts from the power-on in block 101, and after the correct password is entered in block 121, the bootstrap is executed again through block 129.

However, in the procedure described in the flowchart of Figure 3, if the RF antenna is illegally removed and a computer carried away to the outside while the power is on, access to the computer cannot be prohibited until the power is once turned off and the POST is executed. The flowchart shown in FIG. 4 can deal with the case in which the RF antenna is removed while the power is on. When the power is turned on and the POST is executed by the procedure described in FIG. 3 to start the bootstrap, the procedure is started from block 151 by a device driver. In block 153, the Antenna History bit is checked. If the RF antenna is found to be attached at the current execution of the POST, that Antenna History bit was set to "1" in block 105 of FIG. 3. In block 153, the Antenna History bit is checked, and if the bit is "0," which means that the RF antenna is not attached, the process moves to block 157 for termination.

Figure 4:
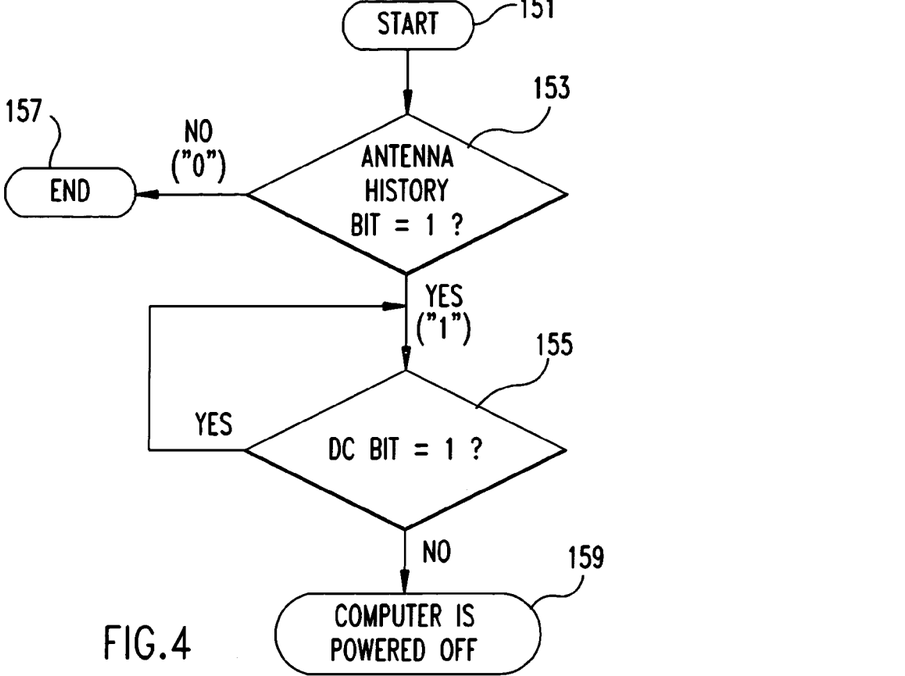
FIG. 4 is a flowchart of an example showing the procedure for supplementing the basic procedure.

If the bit checked in block 153 is "1," which means that the RF antenna is being attached at the current execution of the POST, the process goes to block 155. In block 155, the status of the DC bit is periodically checked by polling. Actually, the polling is preferably carried out by timer interrupt or the like so that it does not prevent the execution of other programs. The CPU periodically monitors the attachment status of the RF antenna 37 unless the RF antenna is removed. If the RF antenna 37 is removed, the process moves to block 159 where the computer is forcibly powered off, so the POST shown in FIG. 3 is restarted when the user turns the power on again. In the procedure of FIG. 3, the processing is performed according to the route of blocks 103, 107, 111, 113, 109, 119, and 121, and a password is requested. That is, if the once attached RF antenna 37 is removed while the power of the computer is on, the POST is executed when the computer is powered on at the next time since the computer is powered off with the timing of the polling of the CPU 11, and thus further access to the computer is not allowed for the user who cannot enter the password.

First Embodiment Showing the Procedure of the Present Invention

In the above basic procedure, description has been made to the case in which access to the computer is prohibited when the RF antenna is illegally removed while the power is on. This embodiment is to deal with the case in which the RF antenna is removed in various energy-saving modes such as known as standby and suspend. A flowchart as the first embodiment showing the procedure of the present invention is shown in FIG. 5.

Figure 5:
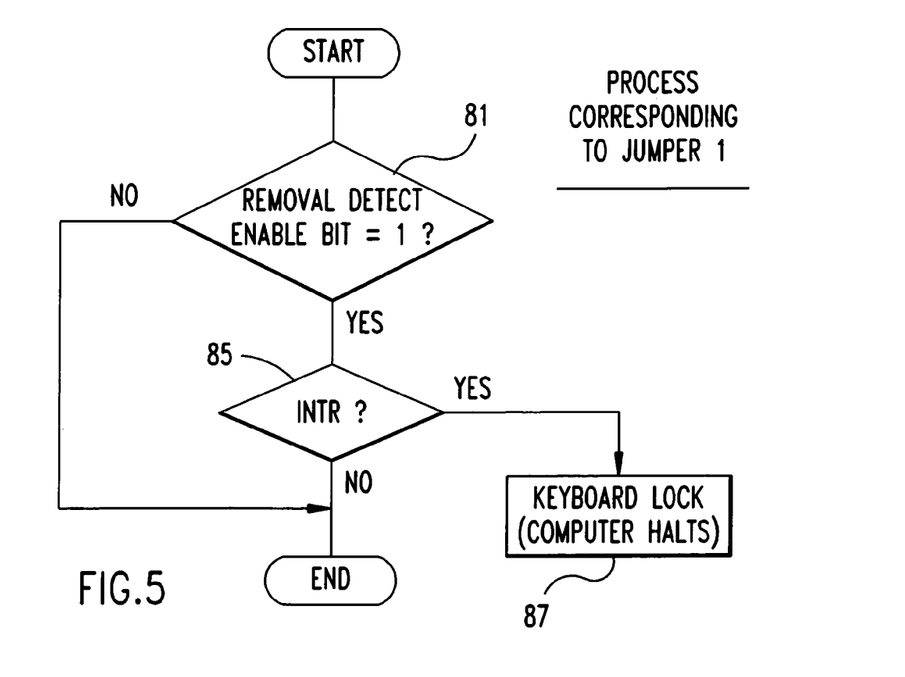
FIG. 5 is a flowchart of the first embodiment showing the procedure of the present invention.

FIG. 5 is a flowchart as the first embodiment showing the procedure of the present invention. When the computer 10 is powered on, the BIOS is read out from the FLASH ROM 49 into the main memory 17, and the CPU 11 read the POST program to execute the following procedure. First, in block 81, it is determined whether or not the setting for enabling the security function of the optional part (Removal Detect Enable bit=1) has been made by a prepared setup utility. For the setting disabling the security function, access to the computer need not be prohibited, and thus block 81 is denied and this procedure is terminated. In addition, the procedure shown in FIG. 5 can be periodically executed.

Even if the RF antenna is actually attached to the computer 10, it does not function until the security function is made effective. Thus, to enable the security function after the RF antenna is actually attached to the computer 10, the user having a proper password sets the optional part by a prepared setup utility when setting the start of the attachment of the RF antenna. This sets the Removal Detect Enable bit to "1." In this case, block 81 is affirmed, and thus, the RFID chip 33 outputs a high-level signal to the control side of the analog switch 67 and one input side of the NAND element 63.

At this point, if the terminal 71 and the terminal 73 are short-circuited by the connection of the first short-circuit element 36, as shown in FIG. 2, the input side (D-terminal) of the flip-flop circuit 65 is at a low level, while the output side is at a high level. Accordingly, high-level signals are inputted to both inputs of the NAND 63, the output of which, the INTR signal, is at low level. On the other hand, if the first short-circuit element 36 is disconnected, the output side of the flip-flop circuit 65 becomes low level after delayed by one clock. Accordingly, the INTR signal, the output of the NAND 63, becomes high level. That is, if the INTR signal becomes high level, the first short-circuit element 36 has been disconnected, or the RF antenna 37 has been removed. Thus, in block 85, the POST checks whether or not the INTR signal (high-level signal) has been outputted, and if the INTR signal is a high-level signal, the process moves to block 87, deeming that the first short-circuit element 36 is removed, where the keyboard is locked to disable the inputting, thereby to halt the computer. Whereupon, the POST stops, and further access to computer is prohibited. On the other hand, if the INTR signal is a low-level signal, the first short-circuit element 36 has been attached, and this procedure is terminated. In addition, the process may move to block 103 described in FIG. 3 to execute the procedure for power-on (the bootstrap or the like is started, or a pending processing is restarted), as described above.

As described above, if the first short-circuit element 36 is removed, or the RF antenna 37 is removed not only after the power-on, in corporation with the power control by the power controller 45, but also when power is supplied in the energy-saving mode for suppressing the power consumption such as so-called standby or suspend, the computer is halted by prohibiting the inputting, and thus, access to the computer can be prohibited if the RF antenna 37 is removed.

Second Embodiment Showing the Procedure of the Present Invention

In the procedure described in the above flowchart of FIG. 5, description has been made to the case in which access to the computer is prohibited when the RF antenna is removed while the power supply is in the energy-saving mode such as suspend. This embodiment deals with the case in which the RF antenna is removed while the power is mechanically turned off, while in the power supply condition of the basic structural part such as called hibernation. That is, in the procedure described in the flowchart of FIG. 5, if the RF antenna is removed, the computer is carried away to the outside, and the RF antenna is attached again while the power is mechanically shut off or while in the lowest power condition of the basic structural part, access to the computer cannot be prohibited. This embodiment deals with this case. A flowchart as the second embodiment showing the procedure of the present invention is shown in FIG. 6.

Figure 6:
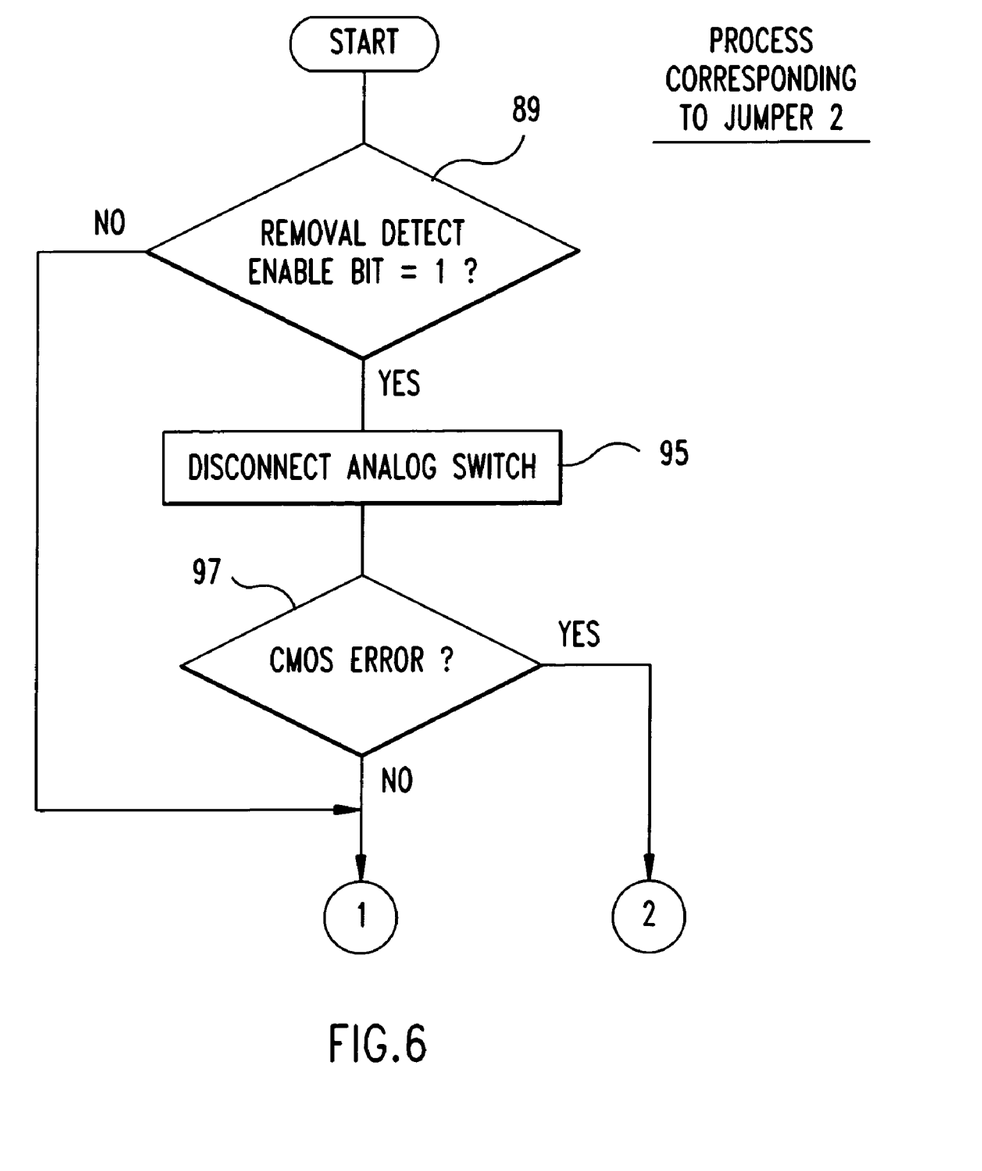
FIG. 6 is a flowchart of an example showing the basic procedure of the present invention.

A flowchart as the second embodiment showing the procedure of the present invention is shown in FIG. 6. When the computer 10 is powered on, the BIOS is read out from the FLASH ROM 49 into the main memory 17, and the CPU 11 reads the POST program and executes the following procedure. First, in block 89, it is determined whether or not the setting enabling the security function of the optional part is provided by a prepared setup utility. For the setting disabling the security function, block 89 is denied because access to the computer need not be prohibited, and this procedure is terminated. Further, the process may move to block 103 described in FIG. 3 to execute the procedure for power-on (the bootstrap or the like is started, or a pending processing is restarted), as described above.

As described above, if the Removal Detect Enable bit is set to "1" or the user having a proper password to actually attach the RF antenna to the computer 10 and enable the security function, block 89 is affirmed, and thus, the RFID chip 33 outputs a high-level signal to the control side of the analog switch 67 through the analog interface 53. This causes the analog switch 67 to operate in block 95, thereby to cut off the conduction between the terminal 75 and the terminal 77.

When the status of the Removal Detect Enable bit is "1," the connection of the second short-circuit element 38 causes the terminal 75 and the terminal 77 to be short-circuited, thereby to supply power from the lithium battery 34 to the CMOS memory, and the disconnection of the second short-circuit element 38 shuts off the power supply from the lithium battery 34 to the CMOS memory. That is, if the second short-circuit element 38 is disconnected, or the RF antenna 37 is removed while the status of the Removal Detect Enable bit is "1," the power to the so-called CMOS memory supplied from the lithium battery 34 is shut off. This causes a CMOS error. When a CMOS error occurs, the process moves to the above block 119 (shown by connector 2 in FIG. 3) at the next power-on, requesting the user for a password. Thus, by the inputting of a correct password, access to the computer can be prohibited if the RF antenna 37 is removed.

On the other hand, if a CMOS error occurs, it is assumed that the second short-circuit element 38 is correctly attached, and the procedure of the FIG. 3 above is executed, thereby to carry out the procedure for prohibiting access to the computer if the RF antenna is removed while the power is off and then the power is turned on. That is, the execution starts from block 103 in FIG. 3.

As described above, in this embodiment, even if the RF antenna 1037 is removed while the computer is in a power-off condition or operating in the energy-saving mode with minimum power, the power supply from the lithium battery to the CMOS can be shut off by the analog switch. Accordingly, if the user reattaches the removed RF antenna and turns the power on again to restart the POST, the user cannot further access the computer if he cannot enter the password, because the power to the CMOS memory is turned off if the once attached RF antenna 37 is removed, so that the POST is executed at the next power-on time.

Figure 7:
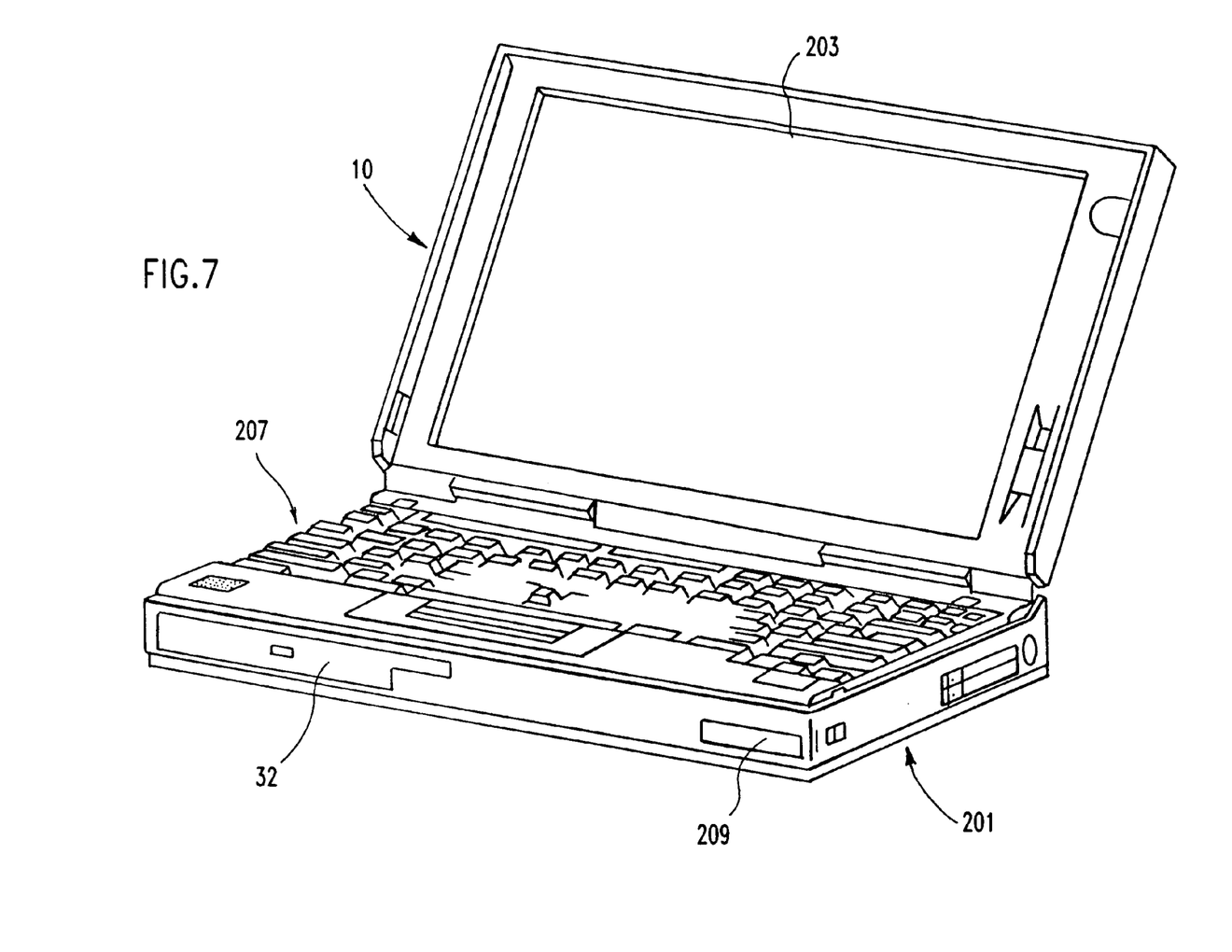
FIG. 7 is an example of the outline view of the computer in which the present invention is carried out.

FIG. 7 shows an example of the outer shape of the computer 10 for which the present invention is carried out. The computer comprises a main body 201 for accommodating the structural elements described in FIG. 1, a liquid crystal display 203, a keyboard 207 arranged in the upper portion of the main body, a CD-ROM drive 32, and the lid 209 of a device bay for housing the HDD 31. The computer 10 has not a specific characteristic outer shape in connection with this embodiment except for the lid 209 of the device bay.

Figure 8:
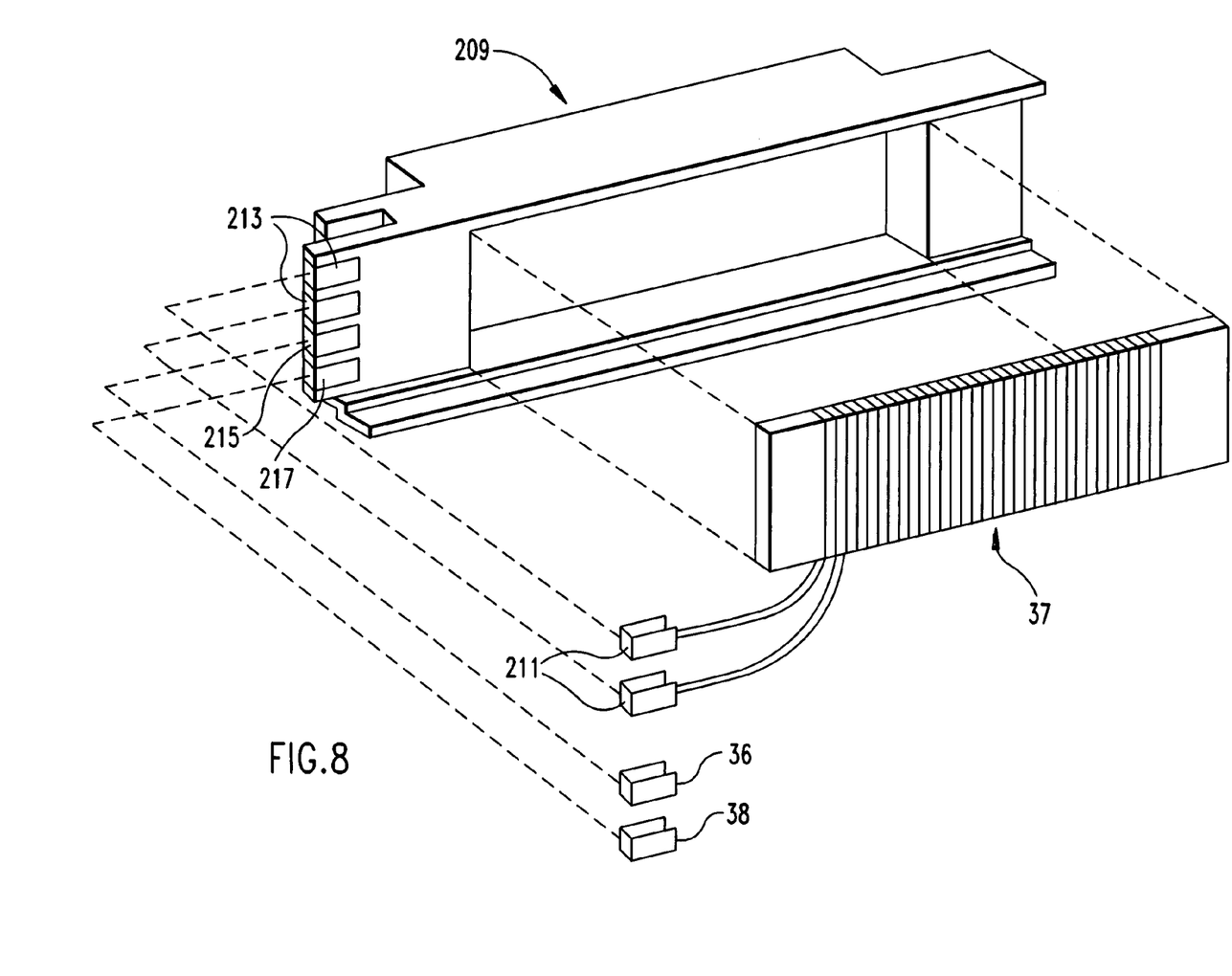
FIG. 8 is a figure showing an example of the method for attaching the RF antenna used in the embodiment of the present invention.

FIG. 8 shows the embodiment of the method for attachment of the RF antenna 37, first short-circuit element 36, and second short-circuit element 38. The RF antenna 37, first short-circuit element 36, and second short-circuit element 38 are stored in the lid 209 of the device bay. After the HDD 31 is removably mounted in the device bay, the lid 209 is attached to the main body 201 in a detachable structure. If the RF antenna 37, first short-circuit element 36, and second short-circuit element 38 are not used, that is, in the computer that does not require the security function, only the lid 209 can be attached to the main body 201 without mounting the RF antenna 37. Further, differently from the lid 209, it is also allowed to prepare a lid of a construction which cannot accommodate the RF antenna 37, first short-circuit element 36, and second short-circuit element 38. By employing such attachment structure of the RF antenna 37, first short-circuit element 36, and second short-circuit element 38 for the lid 209, the RF antenna 37, first short-circuit element 36, and second short-circuit element 38 can be attached by a user or dealer, and according to the necessity of the security function, the user can select any of the lid 209 with the RF antenna 37, first short-circuit element 36, and second short-circuit element 38 or the lid 209 without the RF antenna 37, first short-circuit element 36, and second short-circuit element 38. Inside the lid 209, a coil for the antenna 37 is housed, and its lead portions 211 are fit into the terminal portions 213 of the lid 209 and electrically connected to the RFID chip 33. Further, into the terminal portion 215 of the lid 209, the first short-circuit terminal 36 of the lead portion functioning as a first jumper terminal is fitted, and into a terminal portion 217, the second short-circuit terminal 38 of the lead portion functioning as a second jumper terminal is fitted.

As the place where the RF antenna 37, first short-circuit element 36, and second short-circuit element 38 are attached by such method, not only the lid of the device bay for HDD, but also the lid of the device bay for a peripheral device such as CD-ROM drive, DVD drive, FDD, or battery, or the lid of a multi-bay which can selectively accommodate them can be used. The structure of attachment of the RF antenna 37, first short-circuit element 36, and second short-circuit element 38 to the main body 201 is preferably firm to the extent that an unauthorized person cannot remove them where the computer is used, and that it takes a certain time for the dealer or user to remove them. For instance, not only a detachable structure, but also a structure of screw tightening, or a structure requiring a special tool for the screw can be employed.

The embodiment of the present invention has been described in the example in which access to the computer is prohibited when a security device utilizing RFID is removed, but the scope of application of the present invention is not limited to RFID, and it can also apply to a security device of other type in which the right to access the computer is verified, for instance, by fingerprints.

Although the present invention has been described above according to a specific embodiment, the present invention has more embodiments that can be thought of by a person skilled in the art in consideration of the idea of the present invention.

In accordance with the present invention, a computer could be provided, in which access is prohibited when the security device is removed. Further, in accordance with the present invention, a computer could be provided, which has a structure of attachment of security device that can be attached and removed, and that does not need an additional space.

What is claimed is:

1. A method for prohibiting access to a computer after a security device attached to said computer is removed, comprising the steps of:
   (a) storing setting data comprising a detect enable bit for establishing the computer settings of how to proceed with processing relative to the attachment of a security device to said computer in a first storage unit of said computer;
   (b) detecting the attachment of the said security device to said computer after said step (a) and during one of the power-on and the energy-saving mode of said computer;
   (c) storing the attachment data comprising a security device history bit indicating the detection in step (b) in a second storage unit equipped in said computer;
   (d) detecting a removal of said security device from said computer based on said previously-stored setting data and attachment data; and
   (e) prohibiting access to said computer in response to the detection in said step (d).

2. The method as set forth in claim 1, wherein said step (e) can be eluded by the step of entering a predetermined password.

3. A method for prohibiting access to a computer after a security device attached to said computer is removed, comprising the steps of:
   (a) storing setting data comprising a detect enable bit for establishing the computer settings with respect to the attachment of said security device to said computer in a first storage unit equipped in said computer;
   (b) connecting the connection device of an internal basic power wiring equipped in said computer after said step (a) based on said setting data, thereby to secure a power line;
   (c) when said security device is attached to said computer, disconnecting said connection device while whereby the security device comprises the power line of said internal basic power supply:
   (d) allowing access to said computer when said security device comprises the power line of said internal basic power supply and maintaining said disconnection of said connection device in said step (c): and
   (e) if the security device is removed, prohibiting access to said computer by said disconnection.

4. The method as set forth in claim 3, wherein said step (d) maintains the disconnection by the power supplying of said internal basic power supply of said computer.

5. A computer to which a security device can be attached, comprising:
   a first storage unit which can maintain storage while the main power supply of said computer is at a halt;
   a second storage unit which can maintain storage while the main power supply of said computer is at a halt and a backup power supply is operating;
   a processing unit; and
   a third storage unit having stored therein a program which makes said computer execute the steps of: (a) storing and maintaining setting data comprising a detect enable bit for establishing the computer setting of how to proceed with processing relative to the attachment of a security device to said computer in the first storage unit equipped in said computer: (b) detecting the attachment of the said security device to said computer after said step (a) and during one of the power-on or the energy-saving mode of said computer; (c) storing and maintaining the attachment data comprising a security device history bit indicating the detection in said step (b) in the second storage equipped in said computer; (d) detecting a removal of said security device from said computer based on said previously-stored setting data and attachment data; and (e) prohibiting access to said computer in response to the detection in said step (d), said third storage unit being readable by a computer.

6. A computer to which a security device can be attached, comprising:
   a first storage unit which can maintain storage while the main power supply of said computer is at a halt;
   a connection device operated by an internal basic power supply for connecting an internal basic power wiring;
   a processing unit; and
   a second storage unit having stored therein a program which makes said computer execute the steps of: (a) storing and maintaining setting data comprising a detect enable bit for establishing the computer settings with respect to the attachment of said security device to said computer in the first storage equipped in said computer; (b) connecting the connection device of an internal basic power wiring equipped in said computer after said step (a) based on said setting data, thereby to secure a power supply line; (c) disconnecting said connection device while said security device is attached to said computer to form the power line of said internal basic power supply: (d) maintaining said disconnection in said step (c); and (e) prohibiting access to said computer by said disconnection.

7. The computer as set forth in claim 5, wherein said first storage unit is an RFID tag for use with an RFID system, and said security device is an RF antenna and a first connecting device.

8. The computer as set forth in claim 6, wherein said first storage unit is an RFID tag for use with an RFID system, and said security device is an RF antenna and a first connecting device.

9. The computer as set forth in claim 5, wherein said RF antenna and first connecting device are attached to the lid of the device bay of said computer.

10. The computer as set forth in claim 6, wherein said RF antenna and first connecting device are attached to the lid of the device bay of said computer.

11. The computer as set forth in claim 7, wherein said RF antenna and first connecting device are attached to the lid of the device bay of said computer.

12. The computer as set forth in claim 8, wherein said RF antenna and first connecting device are attached to the lid of the device bay of said computer.

13. The computer as set forth in claim 6, wherein said connecting device is an analog switch.

14. The computer as set forth in claim 7, wherein said connecting device is an analog switch.

15. The computer as set forth in claim 8, wherein said connecting device is an analog switch.

16. The computer as set forth in claim 9, wherein said connecting device is an analog switch.

17. The computer as set forth in claim 10, wherein said connecting device is an analog switch.

18. The computer as set forth in claim 11, wherein said connecting device is an analog switch.

19. The computer as set forth in claim 12, wherein said connecting device is an analog switch.

20. The computer as set forth in claim 14, wherein said security device is an RF antenna, a first connecting device, and a second connecting device.

21. A program storage device readable by machine, tangibly embodying a program of instructions executable by the machine to perform method steps for prohibiting access to a computer after a security device attached to said computer is removed, said method steps comprising:

(a) storing and maintaining setting data comprising a detect enable bit for establishing the computer settings with respect to the attachment of said security device to said computer in the first storage equipped in said computer; (b) connecting the connection device of an internal basic power wiring equipped in said computer after said step (a) based on said setting data, thereby to secure a power supply line; (c) while said security device is attached to said computer, disconnecting said connection device whereby the security device comprises the power line of said internal basic power supply: (d) allowing access to said computer when said security device comprises the power line of said internal basic power supply and maintaining said disconnection in said step (c): and (e) if said security device is removed, prohibiting access to said computer by said disconnection.

22. A program storage device readable by machine, tangibly embodying a program of instructions executable by the machine to perform method steps for prohibiting access to a computer after a security device attached to said computer is removed, said method steps comprising:

(a) storing and maintaining setting data comprising a detect enable bit for establishing the computer settings of how to proceed with processing relative to the attachment of a security device to said computer in a first storage unit equipped in said computer: (b) detecting the attachment of the said security device to said computer after said step (a) and during one of the power-on and the energy-saving mode of said computer; (c) storing and maintaining the attachment data comprising a security device detect bit indicating the detection in said step (b) in a second storage equipped in said computer; (d) detecting a removal of said security device from said computer based on said previously-stored setting data and attachment data; and (e) prohibiting access to said computer in response to the detection in said step (d), a third storage unit being readable by a computer.

* * * * *